United States Patent [19]

Mattheyses

[11] Patent Number: 4,780,873
[45] Date of Patent: Oct. 25, 1988

[54] CIRCUIT SWITCHING NETWORK WITH ROUTING NODES

[75] Inventor: Robert M. Mattheyses, Schenectady, N.Y.

[73] Assignee: General Electric Company, Schenectady, N.Y.

[21] Appl. No.: 864,654

[22] Filed: May 19, 1986

[51] Int. Cl.[4] .............................................. H04Q 11/04
[52] U.S. Cl. .................................. 370/94; 340/825.52
[58] Field of Search ............................. 370/60, 94, 92; 340/825.52; 178/3

[56] References Cited

U.S. PATENT DOCUMENTS

| | | | |
|---|---|---|---|
| 4,556,972 | 12/1985 | Chan et al. | 370/60 |
| 4,587,649 | 5/1986 | Maddern | 370/58 |
| 4,651,318 | 3/1987 | Luderer | 370/94 |
| 4,656,622 | 4/1987 | Lea | 370/60 |
| 4,661,947 | 4/1987 | Lea et al. | 370/60 |

OTHER PUBLICATIONS

"The Connection Machine", by W. D. Hillis, The MIT Press 1985, pp. 54–61 and 78–84.

*Primary Examiner*—Douglas W. Olms
*Attorney, Agent, or Firm*—Paul R. Webb, II; James C. Davis, Jr.

[57] ABSTRACT

A communication network, for transmitting message signals, comprising a plurality of routing nodes and a method for routing message signals through the network are disclosed. The network comprises a plurality of the routing nodes interconnected in stages. Each routing node includes a memory for storing a destination portion of a message signal. Upon subsequent recall of the stored destination portion, a previous route can be reestablished and a message signal absent the destination portion transmitted therethrough.

13 Claims, 5 Drawing Sheets

CIRCUIT SWITCHING NETWORK WITH ROUTING NODES

The present invention relates, in general, to apparatus and method for routing signals in a distributed processing system and more specifically to a routing network including a memory for storing signal routings.

BACKGROUND OF THE INVENTION

Distributed processing is used herein to describe systems in which a plurality of independent signal processing cells interact to perform a multiplicity of signal processing functions. In such systems, neighboring processors are typically interconnected to enable communication between one another. However, such neighborhood communication between processors represents only a portion of the processor communication that may be required in a distributed processing system. Thus, it may also be necessary to provide means to enable any processor in the system to communicate with any other processor. One way to enable such communication between other than neighboring processors, is to provide a separate, global communication network.

The size and complexity of such a global network is a direct function of the number of processing cells in the processing system. Processing system design can be characterized as ranging from a coarse grain to a fine grain design. A coarse grain design is one in which a relative few (e.g., 10's to 100's) large, relatively complex processors are used. At the opposite extreme, a fine grain design is one in which a large number (e.g., tens of thousands) of small, relatively simple processors are used. Thus in a coarse grain design, a simple global communication network would suffice to enable the relative few processors therein to communicate with one another. However, for a processing system with a fine grain design, a large, complex global network is required to achieve full communication between all processors.

A basic building block of such a communication network is the routing node. A routing node is an autonomous switching element through which a switching operation directs a received message signal to a selected output of the routing node. Thus, the individual processors communicate with one another through the routing nodes of the global network. In order to form the network, the routing nodes can be interconnected to form a variety of different communication network topologies. Examples of such network topologies include grids, omega networks, toruses and trees. The choice of topology affects the number of routing nodes required, number of interconnections between routing nodes, speed of communication through the network and the facility with which different forms of message signals are processed on the distributed processing system. One design objective present in the selection of a network topology is the minimization of transmission time through the communication network. Further, the need to minimize transmission time becomes more critical in a large communication network implemented for a processing system having a fine grain design.

A variety of routing algorithms can be used for transmitting message signals through global communication networks. With respect to a number of such algorithms, a portion of the message signal identifies its desired destination. For example where the message signal is in bit-serial form, a plurality of bits in the message signal determine the route of the message through the network to the desired destination. The route length through the network is measured in part by the number of routing nodes through which the message signal is transmitted. Thus, as the communication network increases in complexity, the number of routing nodes through which the message signal is directed, increases. Further, for a bit-serial message signal, the number of bits required to identify the desired destination also increases with network complexity.

The transmission of the destination portion bits of a bit-serial message signal requires a finite amount of transmission time which is not used to transmit actual data. Where the message signal carries a destination portion, each routing node through which the signal is transmitted directs the signal to a selected routing node output in response to the destination portion bits. However, in the course of transmitting the message signal, each routing node must transmit all of the subsequent destination portion bits. It is thus desirable to minimize the transmission time attributable to the destination portion bits. Additionally, where a particular route through the global network is frequently utilized, it is desirable to eliminate the need to transmit the destination bits for each message transmission over the particular route subsequent to an initial transmission.

OBJECTS OF THE INVENTION

It is a principal object of the present invention to provide a new and improved communication network which is not subject to the aforementioned problems and disadvantages.

Another object of the present invention is to provide a global communication network which minimizes the transmission time of messages signals.

A further object of the present invention is to provide a routing node, for use in a global communication network, which minimizes the transmission time of messages transmitted therethrough.

An additional object of the present invention is to provide a global communication network which minimizes the transmission time of signals over frequently used network routes.

Yet a further object of the present invention is to provide a routing node, for use in a global communication network, which minimizes the transmission time of messages over frequently used network routes.

SUMMARY OF THE INVENTION

The foregoing objects are accomplished by the present invention which is directed to a communication network comprising a plurality of routing nodes each including a memory for retrievably storing routing information and a method for routing message signals through the communication network. Each routing node includes a router and the memory. The node further includes a multiplexer having first and second inputs and an output. The first input is adapted to receive incoming signals while the second input is coupled to selectively read from the memory. The multiplexer output is coupled directly to the router input and the memory is further coupled to receive, for storage, message signals applied to the router input.

Upon receipt of a first message at the multiplexer first input, the memory is responsive to an externally applied first memory signal to store the bits of the destination portion that are relevant to its respective routing node. The router establishes a transmission path therethrough in accordance with the relevant bits and transmits the remainder of the message. Prior to transmittal of a subsequent message over the same route as the first message, the relevant bits of the destination portion are recalled from the memory and applied to the router to reestablish the transmission path, the memory being responsive to an externally applied second memory signal to recall those relevant bits. As a result, the subsequent message can be transmitted through the entire routing network without a destination portion and the time for its transmission is correspondingly reduced.

These and other objects of the invention, together with the features and advantages thereof, will become apparent from the following detailed description when read together with the accompanying drawings in which applicable reference designations have been carried forward.

DESCRIPTION OF THE INVENTION

Figure 1:
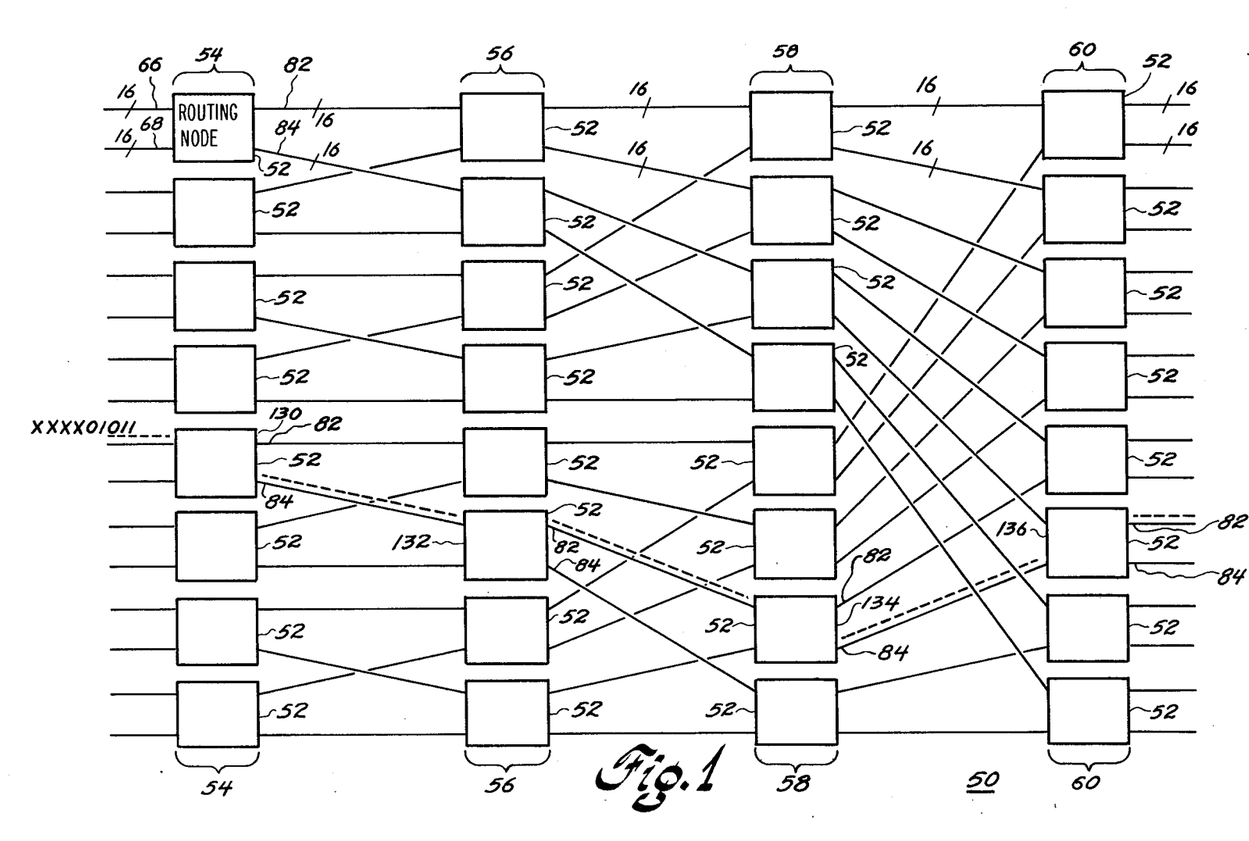
FIG. 1 is a schematic illustration of an exemplary communication network.

Referring now to the drawings, FIG. 1 illustrates an exemplary global communication network 50, as may be used with a distributed processing system for the transmission of message signals. Network 50 comprises a plurality of routing nodes 52 arranged in four columns hereinafter referred to as stages 54, 56, 58 and 60. The four stages are interconnected in the manner illustrated in FIG. 1, the interconnections being determinative of the network topology. Network 50 has a topology known in the art as an omega network.

Figure 2:
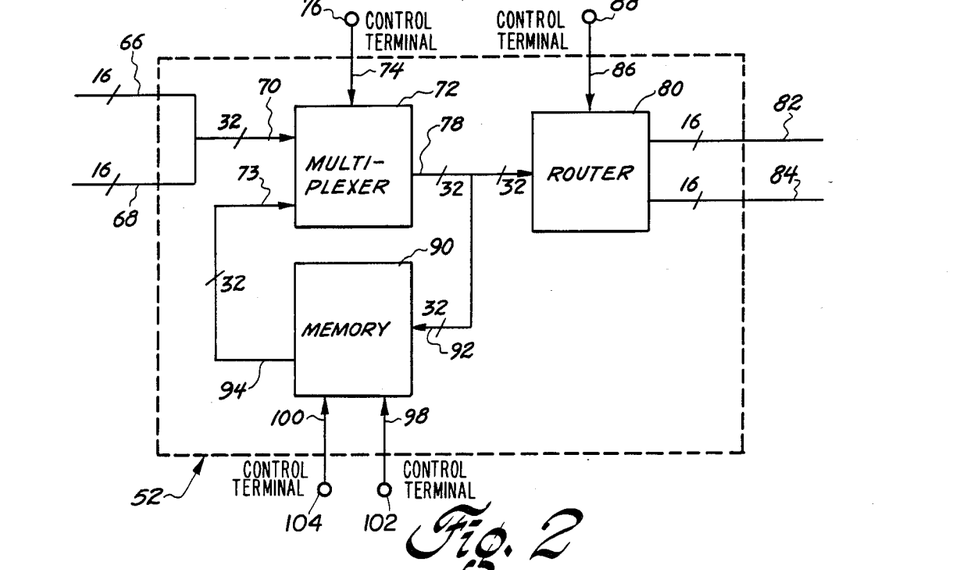
FIG. 2 is an illustrative block diagram of a routing node constructed in accordance with the present invention.

Referring also to FIG. 2, each routing node 52 has a plurality of input lines for receiving incoming message signals. The term "lines" as used herein describes electrical conductors or any other means for signal transmission. In the illustrated embodiment, routing node 52 has 32 incoming lines. For convenience, the 32 incoming lines are divided into two incoming line groups 66 and 68 each of which consists of 16 lines. The connection of the incoming lines to the routing node is diagrammatically illustrated in FIGS. 1 and 2. A single cross hatch and a proximate numeral indicate the actual number of lines at various locations in the routing node and in the network. For example, each incoming line group 66 and 68 has a cross hatch and a numeral "16" proximate thereto to indicate each group has 16 incoming lines.

The 32 incoming lines are connected to a first input 70 of a multiplexer 72. The multiplexer includes a second input 73 and a third input 74. Input 74 is connected to a control input terminal 76. Multiplexer 72 further includes an output 78 consisting of 32 lines. Multiplexer 72 is adapted to normally connect the lines of output 78 to the lines of input 70. However, upon receipt of a multiplexer control signal at control terminal 76, the multiplexer connects the lines of output 78 to the lines of input 73. Multiplexer output 78 is connected to the input of a router 80. Router 80 has two outputs respectively connected to a pair of routing node outputs 82 and 84 each consisting of 16 lines. The router includes an additional input 86 connected to a control input terminal 88. A memory 90 has an input 92, consisting of 32 lines, connected to multiplexer output 78. An output 94 of memory 90, also consisting of 32 lines, is connected to multiplexer input 73. Memory 90 includes two additional inputs 98 and 100 respectively connected to control input terminals 102 and 104.

In the illustrated embodiment, memory 90 is a random access memory. Upon applying a write control signal to control terminal 102 and a memory address control signal to terminal 104, the bits of the message signals on the lines of memory input 92 are stored in the memory at the memory address location determined by the memory address signal. Upon applying a read control signal to control terminal 102 and a memory address signal to terminal 104, the contents of the memory at the memory address location determined by the memory address signal are read on memory output 94. Each memory address location is 32 bits wide in order to store one bit on each of the 32 lines of the multiplexer output.

Figure 3:
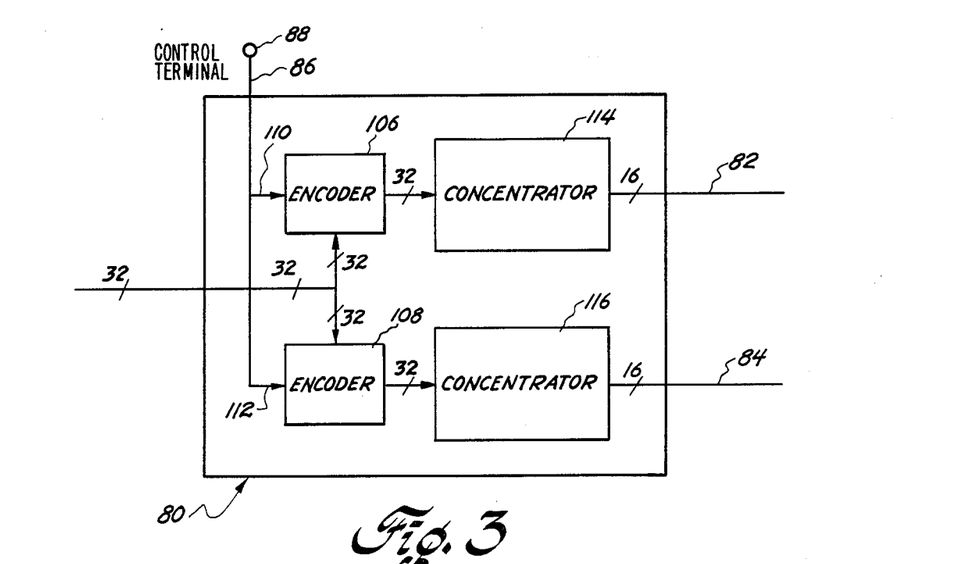
FIG. 3 is a detailed illustrative block diagram of a router.

In the illustrated embodiment of the present invention, router 80 is configured as illustrated in FIG. 3. All 32 incoming lines of router 80 are applied in parallel to the inputs of two encoders 106 and 108. Encoders 106 and 108 respectively have control input lines 110 and 112 connected to control input terminal 88 through router input 86. Encoder 106 has 32 output lines which are connected to the input of a concentrator 114. Similarly, encoder 108 has 32 output lines connected to the input of a concentrator 116. Concentrators 114 and 116 each have an output line group, consisting of 16 lines, respectively connected to routing node outputs 82 and 84.

Figure 4:
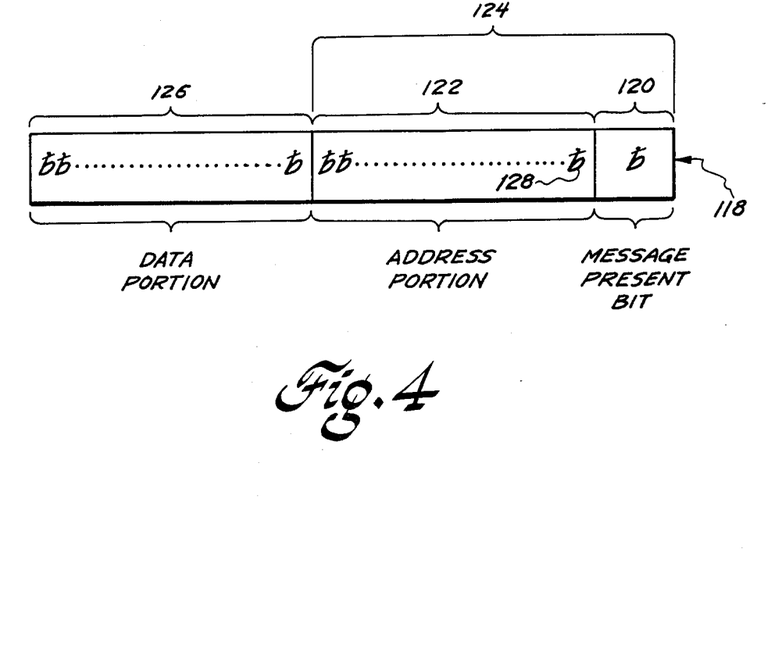
FIG. 4 is an illustration of the format of a message signal.

In the illustrated embodiment of the present invention, router 80 is adapted to transmit therethrough bit-serial message signals having the format illustrated in FIG. 4. A message signal 118 consists of a plurality of binary bits where each "b" represents a binary bit. A message present bit 120 leads the message. A router address portion 122, consisting of a plurality of bits, follows bit 120. Bits 120 and 122 form a destination portion 124 of message signal 118. The remainder of message signal 118 consists of a data portion 126.

Message present bit 120 has the value '1' when an actual message signal follows and the value '0' when no message signal follows. It is preferred herein that when there is no actual message signal, at least a series of '0' bits be transmitted rather than leave a transmission line floating without any signal present. A first bit 128 of address portion 122, immediately following bit 120, designates which of the two routing node outputs 82 or 84 the message signal is to be transmitted on. Bit 128 is '0' or '1' when the message signal is to be transmitted on output 82 or 84 respectively. Thus encoder 106 connected to output 82 treats bit 128 as a transmissible bit when it is '0'. Encoder 108 treats bit 128 as transmissible when it is '1'. Each encoder upon receipt of a message present bit of '1' and a transmissible bit 128, i.e. receipt of '01' by encoder 106 or '11' by encoder 108, strips bit 128 from the message signal and transmits only a '1' in place of bits 120 and 128. Thus, encoder 106, upon receipt of the two bits '01', transmits a '1'. Similarly, encoder 108, upon receipt of the two bits '11', transmits a '1'. The encoder then transmits, unmodified, the balance of address portion 122 and data portion 126. As a result, the transmitted message is one bit shorter than the message applied to the encoder since bit 128 was stripped from it. In response to a message present bit of '0' or a message present bit of '1' and a nontransmissible bit 128, the encoder strips bit 128 and transmits a '0'. Thus, encoder 106 transmits a '0' in response to a received message signal in which the first two bits are '00', '10' or '11'. Similarly, encoder 108 transmits a '0' in response to '00', '10', or '01'. The encoder then transmits, unmodified, the balance of portions 122 and 126 of the message signal. In all cases, the bit transmitted by the encoder in response to bits 120 and 128 serves as message present bit 120 of the message signal at the next routing node in the network. Additionally, though bit 128 is stripped, the next bit in address portion 122 is transmitted unmodified and thus serves as bit 128 of the message signal at the next routing node.

Figure 5:
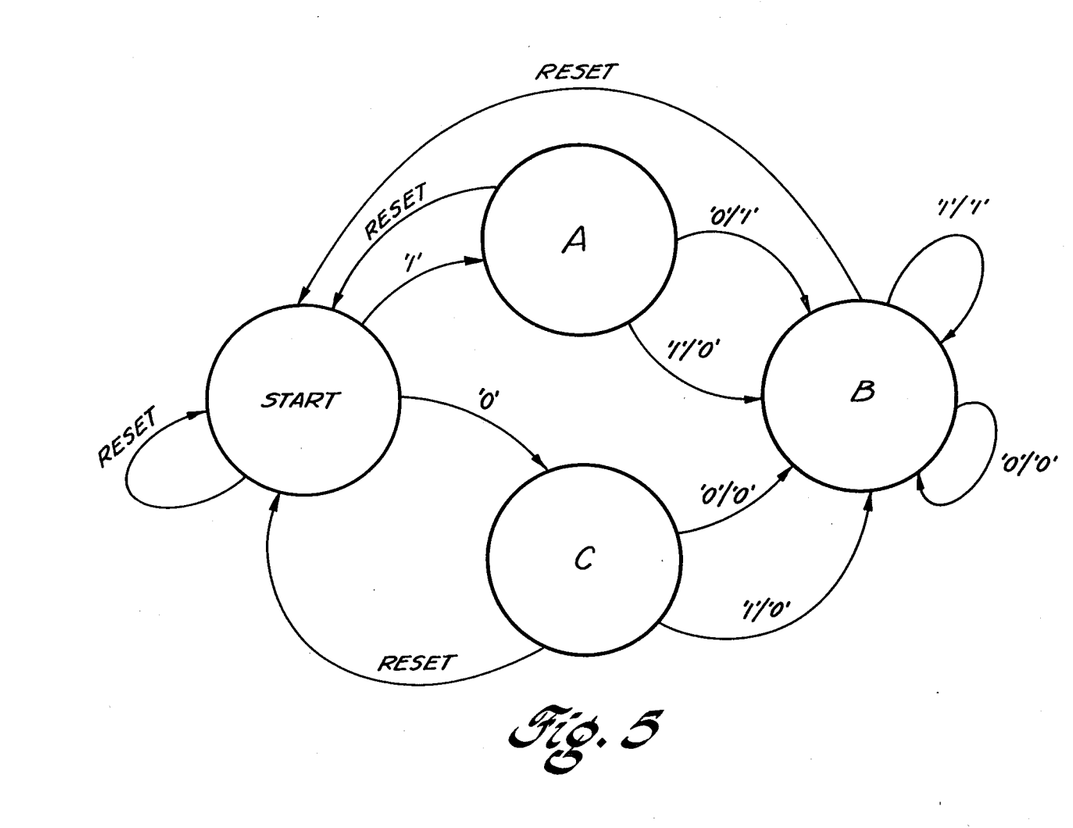
FIG. 5 is a state diagram of an encoder in accordance with the present invention.

Encoders 106 and 108 can each be represented as a state machine which at any one time assumes one of four possible states. FIG. 5 is a state diagram of encoder 106. The four states which the encoder can assume are represented by the four circles labeled "START", "A", "B" AND "C". The "START" state is one which is assumed upon applying a reset signal to the encoder, via control terminal 88, irrespective of the state the encoder is in prior to the reset signal. This is illustrated by the paths labeled "RESET" emanating from each of the four states and arriving on the "START" state. In the "START" state, the encoder is ready to receive message present bit 120. In the case of either encoder 106 or 108, receipt of a message present bit of '1' causes the encoder to change state from the "START" state to the "A" state without transmitting a bit. This is illustrated by the path emanating from the "START" state, arriving on the "A" state and labeled with a '1' bit. In the "A" state the encoder is ready to receive bit 128 of the message signal address portion. In the case of encoder 106 illustrated in FIG. 5, receipt of a '0' as bit 128 causes the encoder to transmit a '1' and change from the "A" state to the "B" state. This is illustrated by the path emanating from the "A" state, arriving on the "B" state and labeled '0'/'1'. In the "B" state, the encoder is ready to receive the remaining bits of the message signal. In the case of either encoder 106 or 108 in the "B" state, upon 15 receipt of '0', the encoder transmits '0' and upon receipt of '1', the encoder transmits '1'. This is illustrated by the two paths, respectively labeled '0'/'0' and '1'/'1', emanating from and arriving on the "B" state. Thus in the "B" state, the encoder merely transmits, unmodified, the remaining bits of the message signal applied thereto.

Referring again to encoder 106 in the "A" state, receipt of a '1' as bit 128, instead of '0', causes the encoder to transmit a '0' and change from the "A" state to the "B" state. This is illustrated by the path emanating from the "A" state, arriving on the "B" state and labeled '1'/'0'. Once in the "B" state, the encoder responds to the remaining bits of the message signal as described above.

Referring again to the "START" state, if instead of a message present bit of '1', either encoder 106 or 108 receives a '0', the encoder changes from the "START" state to the "C" state without transmitting a bit. This is illustrated by the path emanating from the "START" state, arriving on the "C" state and labeled '0'. For either encoder 106 or 108 in the "C" state, receipt of a '0' or a '1' as bit 128 causes the encoder to transmit a '0' and change from the "C" state to the "B" state. This is illustrated by the two paths emanating from the "C" state and arriving on the "B"

state. One path is labeled '0'/'0' to indicate that upon receipt of a '0' while in the "C" state, the encoder transmits a '0' and changes to the "B" state. The other path is labeled '1'/'0' to indicate that upon receipt of a '1' while in the "C" state, the encoder transmits a '0' and changes to the "B" state. Once in the "B" state, the encoder responds to the remaining bits of the message signal as described above. It is preferred herein that encoders 106 and 108 be adapted to change from the "A" or "C" state to the "B" state only in response to an encoder control signal applied to control terminal 88.

A state diagram of encoder 108 would differ from FIG. 5 in that the two paths emanating from the "A" state and arriving on the "B" state labeled '0'/'1' and '1'/'0' would instead be labeled '1'/'1' and '0'/'0' for encoder 108. Thus, while in the "A" state, upon receipt of a '1' or '0' as bit 128, encoder 108 respectively transmits a '1' or '0' and changes from the "A" state to the "B" state.

Router 80 is adapted to simultaneously receive 32 message signals on the 32 input lines. As discussed above, this may include message signals consisting merely of '0' bits if there are not 32 actual message signals being transmitted. All of the message signals are simultaneously applied to the routing node one bit at a time, the rate of bit application being controlled by a processing system clock. Additionally, the message signals are synchronized with one another so that the respective message present bits 120 of the messages arrive simultaneously. Further, the address portions 122 of all message signals are of identical bit length. For illustrative purposes, it is assumed herein that prior to an initial tick of the system clock, bits 120 of all 32 message signals are present on routing node inputs 66 and 68. It is also assumed a reset signal is applied, prior to the initial tick, to encoders 106 and 108 so they are each ready to receive bits 120 of the message signals. In the absence of a multiplexer control signal, bits 120 of the message signals are present on the router input and hence on the encoder inputs. A clock signal is applied to both encoders 106 and 108 at every clock tick causing each to receive the bits present on its input lines. As a result, at the initial clock tick, bits 120 of all 32 signals are received in both encoders. Also at the initial clock tick, bits 128 of all 32 message signals are applied to the router input. On the next clock tick, the clock signal causes bits 128 to be received in both encoders. The encoder control signal is also applied on this tick to control terminal 88 causing each encoder to respond to the pair of bits 120 and 128 of each message signal in the manner described above. Before the next clock tick, each encoder transmits a responsive '0' or '1' bit for each pair of bits 120 and 128 on each of the 32 input lines. On subsequent successive clock ticks, the remaining bits of the message signals are applied to the routing node and transmitted therethrough unmodified, as previously discussed.

Referring again to FIG. 3, it is seen that each concentrator 114 and 116 has 32 lines for receiving the bits transmitted by encoders 106 and 108 respectively. The 32 message signals of each encoder are thus simultaneously applied to its respective concentrator at the system clock rate. It is the function of each concentrator to establish a transmission path between each of its 16 output lines and as many as possible of its 32 input lines that carry a message signal the message present bit of which is '1'. Where there are fewer than 16 input lines carrying message signals with a message present bit of '1', the concentrator establishes transmission paths between any unused concentrator output lines and input lines with a message present bit of '0'. If exactly 16 input lines carry message signals with a message present bit of '1', then the concentrator establishes transmission paths between each of its 16 output lines and one of the input lines carrying such a message signal. Where more than 16 of the concentrator input lines carry message signals with a message present bit of '1', the concentrator establishes transmission paths between its 16 output lines and a subset of 16 input lines carrying a '1'. The priorities assigned to the incoming lines in selecting the subset are arbitrarily established by the system designer to best suit overall system requirements. It is preferred herein that the concentrator be constructed of combinational logic adapted to operate as described above. As a result, each concentrator in response to the message present bits of the 32 message signals received from its encoder, establishes 16 transmission paths before the next clock tick. Thus, the message present bits of the 16 message signals provided with a transmission path are present on one of the routing node outputs when the next clock tick occurs. The transmission path established between a concentrator output line and an input line is sustained to enable transmission of the balance of the message signal.

Thus in general, each routing node 52 establishes a transmission path therethrough to one of its two outputs, for each message signal carrying a message present bit of '1', in accordance with bit 128 of address portion 122. As previously discussed, bit 128 is stripped by the encoder and the next bit in the address portion moves into the bit 128 position. This latter bit determines the routing of the message signal through the routing node in the next stage of the communication network. In this manner, a message signal arriving at stage 54 of network 50 is transmitted through one routing node in each of the four stages 54, 56, 58 and 60 in succession. As a result, there are as many bits in address portion 122 of a message signal entering the communication network as there are stages. Since network 50 has four stages, the address portion of the message signal to be transmitted through the network must have four address bits. Each of the four address bits are stripped off in turn at the succeeding stages of the network. The four address bits define a unique route through network 50 since each uniquely determines on which routing node output the message signal is to be transmitted at each network stage.

At each stage of network 50, message present bit 120 and first address bit 128 of the 32 message signals on the router input lines are stored in memory 90. This is achieved by applying write and memory address signals to control terminals 102 and 104 respectively at the successive clock ticks when bits 120 and the bits 128 are present on the router input lines. Thus the memory at each routing node through which a message signal is transmitted stores bits 120 and 128 of destination portion 124. With the capability to store a route in the routing node memories, it is possible to transmit a subsequent message signal along an old route that was previously stored. Prior to transmittal of the subsequent message; the previously stored bits 120 and 128 of the old route destination portion are recalled from the memories at the respective routing nodes and applied to their respective routers. This is achieved at each routing node by applying read and memory address signals to control terminals 102 and 104 respectively on each of two successive clock ticks. With a multiplexer control signal applied to control terminal 76, the previously stored bits 120 and 128 are respectively read on the successive clock ticks, onto the router input. By applying encoder control signals in the manner previously described, transmission paths are established through the router in accordance with the recalled bits. As a result, the old route is established through network 50. Then only data portion 126 of the subsequent message signal is transmitted through network 50.

The operation of routing node 52 and network 50 are best illustrated by evaluating the progress of one message signal transmitted through the network at each tick of the system clock. The four stages of network 50 through which the message signal passes are illustrated in a tabular format in FIG. 6. The message signal to be transmitted through the network is 'XXXX01011' and so appears to the left of stage 54 in FIG. 6. With reference to the previously described message signal format, message present bit 120 is '1', address portion 122 is '0101', destination portion 124 is '01011' and data portion 126 is 'XXXX'. Each 'X' is an individual bit.

For illustrative purposes, it is assumed the message signal 'XXXX01011' is applied to a routing node 130 in stage 54 of FIG. 1. The routing nodes in stages 56, 58 and 60 through which the message is transmitted are respectively designated 132, 134 and 136 in FIGS. 1 and 6. Since bit 128 being '0' or '1' respectively results in a message signal being transmitted on routing node output 82 or 84, the address portion bits '0101' result in the message being transmitted over routing node output 84 of routing node 130, output 82 of routing node 132, output 84 of routing node 134 and output 82 of routing node 136. The route for the message is indicated by a dashed line in FIG. 1.

In the course of transmitting the message through network 50, bits 120 and 128 are stored in the routing node memory at each stage. It is preferred herein that these two bits be stored at the same address locations in each memory. The notation preferred herein for keeping track of the stored bits of a route is to assign a route number. Examples of route numbers are 0, 1, 2, 3, etc. The memory address locations in which the two bits 120 and 128 are stored derive from the route number. In particular, bits 120 and 128 are respectively stored in adjacent memory address locations #2×(route number) and #2×(route number)+1. For example, bits 120 and 128 of route number 0 are respectively stored at memory address locations #0 and #1, while bits 120 and 128 for route number 3 are respectively stored at memory address locations #6 and #7. This notation enables unique identification of a route and the memory address locations of its stored bits for later recall.

Figure 6:
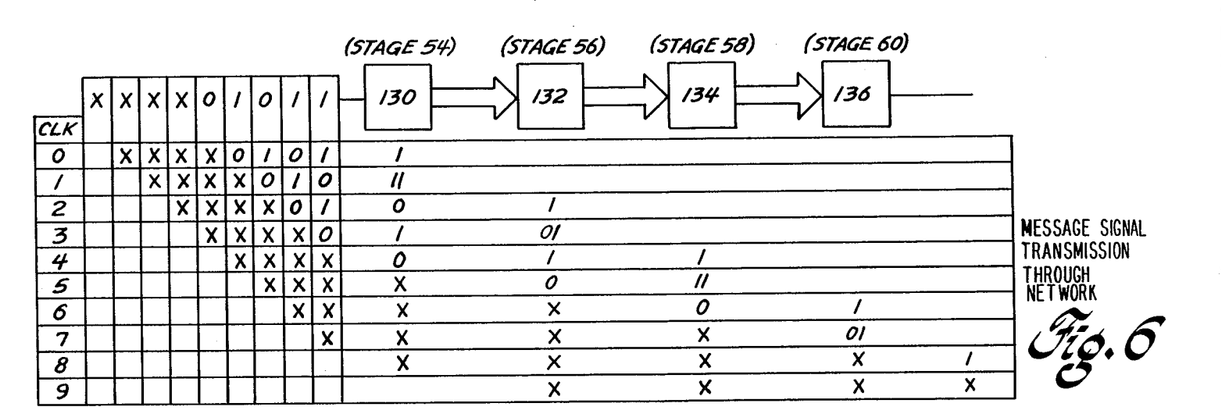
FIG. 6 is a diagrammatic illustration of the transmission of a message signal through the network of FIG. 1.

The column of FIG. 6 labeled CLK indicates ticks of the system clock, commencing with an initial tick 0. The row corresponding to each clock tick indicates the position of the various message signal bits throughout the communication network. Any bit appearing below a particular network stage is within the routing node at that stage for the particular clock tick. With respect to the discussion of FIG. 6, all bits of the message signal pass through the multiplexer via input 70 and output 78 to arrive at the router. It is assumed that prior to clock tick 0, message present bit 120 is present on the router input of routing node 130.

At clock tick 0, the message present bit '1', is received in both encoders 106 and 108 of routing node 130, a write signal is applied to control terminal 102 and an address signal is applied to terminal 104. For illustrative purposes, it is assumed the route number is 3. As a result, the message present bit is written into memory 90 at address location #6.

At clock tick 1, bit 128, i.e., '1', is received in both encoders and an encoder control signal is applied to control input 88 causing the encoders to process the bits therein. Since bit 128 is '1', encoder 106 strips bit 128 and transmits a '0' which is applied to concentrator 114. Encoder 108 strips bit 128 and transmits a '1' which is applied to concentrator 116. For illustrative purposes, it is assumed a concentrator output line is available and that concentrator 116 establishes a transmission path between the concentrator input line to which the bit '1' is applied and the available output line. Thus, bit '1' appears on routing node output 84 and at the input of routing node 132 as message present bit 120 of the message signal.

Also at clock tick 1, write and address signals are respectively applied to control terminals 102 and 104 of routing node 130. As a result, bit 128 is written into memory 90 at address location #7.

At clock tick 2, the '1' bit on output 84 of routing node 130 is received in encoders 106 and 108 of routing node 132 and the next bit, '0', in address portion 122 of the message signal is received in the encoders of routing node 130. Encoder 108 of routing node 130 passes the '0' bit unmodified to concentrator 116 where the bit passes over the established transmission path to output 84. Also at clock tick 2, write and address signals are respectively applied to control terminals 102 and 104 of routing node 132. As a result, the message present bit '1' is written into the routing node 132 memory at address location #6.

At clock tick 3, the '0' bit on output 84 of routing node 130 is received as bit 128 in the encoders of routing node 132. Also at clock tick 3, the next bit, '1', in address portion 122 of the message signal is received in the encoders of routing node 130. Additionally at clock tick 3, an encoder control signal is applied to control input 88, of routing node 132, causing the encoders to process the two bits '01' therein. Encoder 106 strips bit 128 and transmits a '1' which is applied to concentrator 114. Encoder 108 Strips bit 128 and transmits a '0' which is applied to concentrator 116. Assuming a concentrator output line is available, concentrator 114 of routing node 132, establishes a transmission path between the concentrator input line, to which the '1' bit was applied, and the available output line. Thus, the '1' bit appears on routing node output 82 and at the input of routing node 134.

In this manner and as illustrated in FIG. 6, the bits of the message proceed with the clock ticks through the succeeding stages of network 50. Further, at each network stage bits 120 and 128 are stored in the routing node memory at memory addresses #6 and #7. As seen in FIG. 6, this succession of events results in the first bit of message data portion 126 exiting the communication network on clock tick 9.

Figure 7:
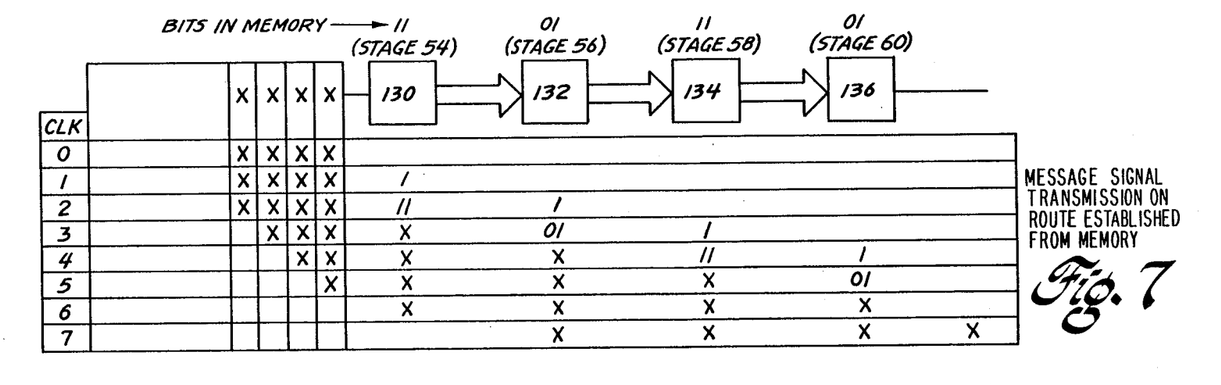
FIG. 7 is a diagrammatic illustration of the transmission of a message signal, on a route established from memory, through the network of FIG. 1.

FIG. 7 illustrates, using the same tabular format as FIG. 6, the transmission of one message signal consisting only of data portion 126 over a route recalled from the routing node memories. The message being transmitted is 'XXXX'. The bits stored in memory are indicated above each network stage in FIG. 7.

At clock tick 0, read and address signals are respectively applied to control terminals 102 and 104 of routing node 130. As a result, the message present bit, '1', from memory address location #6 appears on memory output 94 and is thereby applied to multiplexer input 73. Also at clock tick 0, a multiplexer control signal is applied to control terminal 76 to cause the multiplexer to switch multiplexer output 78 from input 70 to input 73. As a result, message present bit 120 on input 73 is transmitted through the multiplexer and applied to the router input in routing node 130.

At clock tick 1, the message present bit is received in the encoders of routing node 130. Also at clock tick 1, read and address signals are respectively applied to routing node control terminals 102 and 104 at both routing nodes 130 and 132. As a result, bit 128, '1', from memory address location #7 of the routing node 130 memory appears on memory output 94 and hence multiplexer input 73. At routing node 132, the message present bit, '1', is read from memory address location #6 of the routing node 132 memory and so appears on memory output 94 and multiplexer input 73. Multiplexer control signals are also applied at clock tick 1 to the respective control terminals 76 of routing nodes 130 and 132. As a result, bit 128 is applied to the router input in routing node 130 and bit 120 is applied to the router input in routing node 132.

At clock tick 2, message present bit 120 is received in the encoders of routing node 132. Also at clock tick 2, read and address signals are respectively applied to control terminals 102 and 104 at both routing nodes 132 and 134. As a result, bit 128, '0', from memory address location #7 in the routing node 132 memory appears on memory output 94 and multiplexer input 73 connected thereto. In routing node 134, the message present bit, '1', is read from memory location #6 and so appears on memory output 94 and multiplexer input 73 connected thereto. Additionally at clock tick 2, multiplexer control signals are applied to the respective control terminals 76 of routing nodes 132 and 134. As a result, bit 128 is applied to the router input in routing node 132 and bit 120 is applied to the router input of routing node 134. Further, at clock tick 2, an encoder control signal is applied to control input 88 of routing node 130. Bit 128 is received in the encoders of routing node 130 and, in response to the encoder control signal, bits 120 and 128 are processed and a transmission path is established on output 84 of routing node 130.

At clock tick 3, a first data bit is received in routing node 130, bit 128 is received in the routing node 132 encoders and bit 120 is received in the routing node 134 encoders. Also at clock tick 3, read and address signals are respectively applied to control terminals 102 and 104 at both routing nodes 134 and 136. As a result, bit 128, '1', from memory address location #7 in the routing node 134 memory appears on memory output 94 and multiplexer input 73 connected thereto. In routing node 136, the message present bit, '1', is read from memory address location #6 and so appears on memory ouput 94 and multiplexer input 73 connected thereto. Multiplexer control signals applied, at clock tick 3, to the respective control terminals 76 of routing nodes 134 and 136 result in bits 128 and 120 respectively being applied to the router inputs in routing nodes 134 and 136. Further, at clock tick 3, an encoder control signal is applied to control input 88 of routing node 132. As a result, a transmission path is established on output 82 of routing node 130.

In this manner, bits 120 and 128 are recalled from the respective memories of the succeeding stages of network 50 and the transmission paths through the respective stage routing nodes is reestablished. As the old route is reestablished, data portion 126 of the message signal progresses through the network. As is seen in FIG. 7, the first bit of data portion 126 exits the communication network on clock tick 7.

Generally, in a communication network having "n" stages, when transmitting a message signal including a destination portion, the first bit of the data portion exits the network on clock tick $2n+1$. If one tick is added for initially applying the message signal to the routing node, then the first data bit exits at clock tick $2n+2$. Thus in a four stage network, the first data bit can be considered to exit on clock tick 9, as was illustrated in FIG. 6, or tick 10 if time for message signal application is also considered. When transmitting a message signal consisting only of data portion 126 on a route recalled from the routing node memories, the first data bit exits the network on clock tick $n+3$. Since message signal application can be performed while the transmission path is being restablished in the first stage routing node, an additional clock tick for message signal application is not required. Thus, in a four stage network, the first data bit exits on clock tick 7 as was illustrated in FIG. 7. The transmission time saved by routing a message signal consisting of data portion 126 over a recalled route increases with the number of network stages. In practice, global communication networks are significantly larger than the exemplary network illustrated in FIG. 1 and consist of more than four stages. The transmission time saved in such practical networks is significantly greater than that illustrated herein with respect to exemplary network 50.

The method for routing a bit-serial message signal through a global communication network in accordance with the present invention thus comprises the initial step of applying a first message signal including a destination portion to a routing node in the first stage of the network. Next, as the message signal is routed through the routing nodes of the succeeding networks stages, bits 120 and 128 of the destination portion are stored in a routing node memory at each stage. As a result, the route through the network for the first message signal is stored in the respective routing node memories. In order to subsequently route a second message signal comprising only data portion 126, over the route of the first message signal, bits 120 and 128 are first recalled from the routing node memories at the network stages. This results in the route of the first message being reestablished. The final step is to route the second message over the reestablished route.

Network 50 as illustrated herein is provided as an exemplary network to enable description of the present invention. In practice, such a network typically consists of many more stages and many more routing nodes per stage. Further, as discussed above, the routing nodes may be interconnected to form network topologies other than the omega network illustrated herein. The invention disclosed herein can be effectively practiced on different size networks with various network topologies.

The recall of address bits from the respective routing node memories is disclosed herein as following a sequence through the successive stages of the communication network. This technique is preferred since it enables the pipelining of message signals. That is, the stored address bits of a previous route can be recalled from the first stage of a network while, simultaneously, the remainder of an entirely different message signal is still being transmitted over a latter stage of the network. There are, however, other techniques for recalling the stored address bits of a previous route. For example, where pipelining is not desired, the message present bits stored in the routing node memories of succeeding stages can all be recalled simultaneously. Then bits 128 can be recalled simultaneously. As a result, the entire stored route can be reestablished by clock tick 3.

With respect to the encoder described herein, upon application thereto of a message present bit of '0' or a message present bit of '1' followed by a nontransmissible bit 128, the encoder transmits a '0', which becomes the message present bit, followed by the remainder of the message signal unmodified. However, the remainder of the signal need not be transmitted unmodified. As discussed above, a message present bit of '0' means that no actual message follows. Thus, it does not matter what bits follow the message present bit. For example, rather than transmitting th remainder of the signal unmodified, it may be preferred that the encoder be adapted to instead transmit a series of '0'"s or a random series of bits.

While it is stated herein that the number of address bits in the message signal is equal to the number of stages in the communication network, this is only true where each routing node has only two possible outputs. Then only one address bit is required to direct the message signal to one of the two possible routing node outputs at each stage. However, if each routing node has greater than two outputs, then more than one address bit is required to direct the message signal to a particular output. For example, if each routing node has four outputs, a pair of address bits is required to direct the message signal to a particular output in the routing node. That is, instead of a single bit 128, the address bit pairs '00', '01', '10' and '11' would determine on which routing node output a message is transmitted. In such a case, three memory address locations would be required to store the message present bit and the address bit pair.

The illustrated embodiment of the routing node and communication network is shown herein as including 32 input lines to each routing node and 2 outputs from each node each consisting of 16 lines. However, the invention is not so limited. The number of lines connected to each node can be varied in accordance with the design requirements of the processing system to which it is coupled. Obviously, as the number of input and output lines per routing node is increased or decreased, the through transmission capacity of the network correspondingly increases or decreases.

While routing node 52 is disclosed herein as including a multiplexer, the invention is not so limited. In place of the multiplexer, any device or combination of devices capable of performing the same function may be used. The routing node illustrated and described herein has a dedicated memory. It will be evident to those skilled in the art that one or more common memories may be provided to each serve multiple routing nodes rather than to include a dedicated memory in each routing node.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A routing node for use in a communication network including a plurality of said nodes interconnected for the transmission of a group of bit-serial messages therethrough, said routing node comprising:
    a router for receiving said group of bit-serial messages and establishing message transmissiion paths for selected ones of said messages, each said transmission path being established on a preselected one of a plurality of router outputs;
    said router responsive to predetermined bits of a destination portion in each said message to establish said transmission paths on said preselected router outputs for said selected ones of said messages;
    memory means, responsive to an externally applied first memory signal, for receiving and storing the predetermined bits of the respective destination portions of said messages in said message group; and
    means for transmitting a subsequent group of bit-serial messages through said routing node in accordance with the stored destination portion predetermined bits associated with a previous group of bit-serial messages, each message in the subsequent group being without the destination portion so that the subsequent message group is transmitted through said network in less time than required for the transmission of the previous message group.

2. The routing node of claim 1 wherein upon the substantially simultaneous receipt of said destination portion predetermined bits of said message group by said router, said router is responsive to substantially simultaneously establish said transmission paths for said selected messages.

3. The routing node of claim 1 wherein the respective destination portion predetermined bits of said messages in said message group are stored at a predetermined address location in said memory means; and
    said subsequent message transmitting means including means for recalling said message group destination portion predetermined bits from said predetermined address location of said memory means, the recalled destination portion predetermined bits being received by said router to establish therethrough said transmission path for a group of said subsequent messages, said memory means being responsive to an externally applied second memory signal to recall said destination portion predetermined bits from said predetermined address location.

4. The routing node of claim 3 wherein said router has a pair of said outputs; and
    said memory means adapted to store first and second bits of said destination portion respectively at first and second ones of said predetermined address locations.

5. The routing node of claim 3, said subsequent message transmitting means further comprising multiplexing means adapted to receive both said message group and said recalled destination portion predetermined bits; and
    said multiplexing means responsive to an external multiplexer signal to apply either said message group or said recalled destination portion predetermined bits to said router.

6. A communication network for the transmission of a group of bit-serial messages therethrough, comprising:
    a router for receiving said group of bit-serial messages and establishing message transmission paths for selected ones of said messages to different ones of a plurality of router outputs in response to predetermined bits of a destination portion of each said selected message;
    memory means associated with said router and responsive to an externally applied first memory signal for receiving and storing the predetermined bits of the respective destination portions of said messages in said message group; and
    means for transmitting a subsequent group of bit-serial messages through said router in accordance with the stored destination portion predetermined bits associated with a previous group of bit-serial messages, each message in the subsequent group being without the destination portion so that the subsequent message group is transmitted through said network in less time than required for the transmission of the previous message group.

7. The communication network of claim 6 wherein said router is adapted to receive the destination portion predetermined bits of aaid message group substantially simultaneously; and
    said memory means adapted to receive and store the destination portion predetermined bits of said message group substantially simultaneously.

8. The communication network of claim 6 wherein said memory means is adapted to store said destination portion predetermined bits at a predetermined address location; and
    said subsequent message transmitting means comprising means for recalling said stored destination portion predetermined bits from said predetermined address location in said memory means, the recalled destination portion predetermined bits being received by said router to establish said transmission path for said subsequent group of messages, said memory means being responsive to an externally applied second memory signal to recall said detination portion predeteremined bits from said predetermined address location.

9. The communication network of claim 8 wherein said router has a pair of said outputs; and
    said memory means adapted to store first and second bits of said destination portion respectively at first and second ones of said predetermined address locations.

10. The communication network of claim 8, said subsequent message transmitting means further comprising multiplexing means adapted to receive both said message group and said recalled destination portion predetermined bits; and
    said multiplexing means responsive to an external multiplexer signal to apply either said message group or said recalled destination portion predetermined bits to said router.

11. A routing node for use in a communication network, said network including a plurality of said nodes interconnected for the transmission of bit-serial message signals, said routing node comprising:

a router having an input for receiving said message signals and a plurality of outputs, said router establishing a required transmission path on a selected one of said router outputs;

multiplexing means having an output coupled to said router input, a first input, and a second input, said multiplexing means being adapted to effect a first or a second coupling respectively between said multiplexing means output and either said first or said second input;

memory means including an input coupled to said router input, an output coupled to said multiplexing means second input and a control port for receiving first and second control signals;

said memory means responsive to said first signal to store the signal present on said router input, said memory means being responsive to said second signal to read a selected previously stored signal onto said multiplexing means second input; and said router responsive to predetermined bits of a destination portion included in a first type of said message signal to establish said required transmission path;

whereby upon receiving of said first signal while each said destination portion predetermined bit is present on said multiplexing means first input and said multiplexing means effecting said first coupling, said destination portion predetermined bits are stored in said memory means, and further upon receiving said second signal and said multiplexiing means effecting said second coupling, previously stored destination portion predetermined bits are read onto said multiplexing means second input to thereby establish said required transmission path in accordance with said previously stored destination portion predetermined bits.

12. A method for routing bit-serial messages through a routing node in a communication network, said method comprising the steps of:

applying a first message to said routing node, said first message including predetermined bits of a destination portion;

storing said destination portion predetermined bits;

establishing a selected transmission path through said routing node in accordance with said destination portion predetermined bits;

transmitting said first message through said routing node on said selected path;

recalling said stored destination portion predetermined bits;

establishing said selected path for a second message through said routing node in accordance with said recalled destination portion, said second message including a data portion but being without the destination portion; and transmitting said second message through said routing node on said selected path, so that the second message without the destination portion is transmitted through said network in less time than required for the transmission of the first message.

13. The method of claim 12, said routing node including memory means responsive to a first control signal to store said destination portion predetermined bits at a predetermined address location in said memory means, said memory means further responsive to a second control signal to recall said stored destination portion predetermined bits from said predetermined address location, said method comprising, prior to said storing step, the step of:

applying said first signal to said memory means; and said method comprising, prior to said recalling step, the step of applying said second signal to said memory means.

* * * * *